Feb. 15, 1949. M. T. BULLOCK 2,461,516
WATER METER REDUCING ADAPTER
Filed April 11, 1945
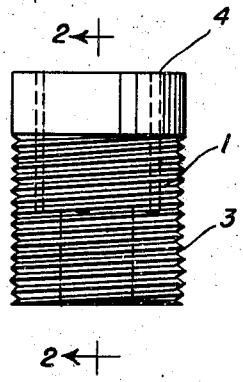
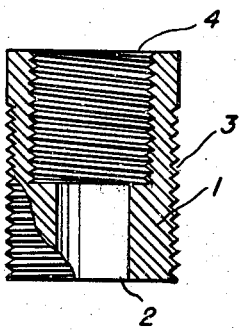
INVENTOR.
Martin T. Bullock
BY *Victor J. Evans & Co.*
ATTORNEYS Patented Feb. 15, 1949

2,461,516

UNITED STATES PATENT OFFICE 2,461,516

WATER METER REDUCING ADAPTER

Martin T. Bullock, Meridian, Miss.

Application April 11, 1945, Serial No. 587,733

1 Claim. (Cl. 285—160)

My present invention, in its broad aspect, has to do with improvements in adapters for use with water meters, whereby water meters of different ratings and capacities may be quickly, readily and economically changed without the necessity of cutting and changing pipes leading out of the meter boxes, and the meter connections and collars, and fixed meter installations. It often happens that water meters of different ratings or capacities have different schedules of minimum rates of charge, and a customer may wish to install a meter of less rating or capacity. If the meter installation is in concrete which is sometimes the case, the operation is laborious and expensive, and with present day installations of all kinds there is a considerable element of cost and expense. Where my adapters are used, however, the cost in materials and labor is materially reduced, and the installation of a meter of lower rating or capacity is materially simplified, and rendered more economical and practical.

Other and equally important objects and advantages of my invention will be apparent from the following description and drawings, and it is pointed out that changes in form, size, shape, materials, and construction and arrangement of parts are permissible and within the purview of my broad inventive concept and the scope of the appended claim.

In the drawings wherein I have illustrated a preferred form of my invention:

Figure 1 is a side view, and

Figure 2 is a section on the line 2—2 of Figure 1.

In the drawings, wherein like characters of reference are used to designate like or similar parts:

The numeral 1 designates the body of my adapter, which may be of any desired size, for instance, to make a reduction from a one-inch meter, to a three-fourths inch meter, or from a one-inch meter to a five-eighths inch meter, or from a three-fourths inch meter to a five-eighths inch meter, or the like. The adapter is bored as at 2 and has external threads 3 for the greater part of the length of the adapter leaving a collar with a smooth peripheral surface at one end, and internal threads 4 in the reducing portion of the adapter communicating with the bore; all threads and the bore are parallel with the axis of the adapter.

In explaining the operation of my device, it is pointed out that different sizes of meters have different pipe lengths and threads, and sometimes meter boxes are set in concrete, so that changing from a larger size to a smaller size may require breaking the concrete around the meter box, changing the pipe connections to conform to the shorter and smaller connection of the smaller meter, and changing collars and the like, and then replacing the concrete if the box has been set in concrete. With my adapters, which are used in pairs, all that is required to make a change, as for instance, from a one-inch meter to a five-eighths inch meter, is to insert a regular five-eighths in. meter connection gasket in the one-inch to five-eighths inch adapter, screw an adapter on each end of the five-eighths inch meter, loosen the original two one-inch meter connection collars, lift out the one-inch meter, place a one-inch meter connection gasket under each of the original one-inch connection collars, and screw the collars on the adapters. This completes the full installation except for turning the water off and on, and a material saving in labor and material is effected.

From the foregoing, it is believed that the operation and objects and advantages and construction of my invention will be apparent, but it is again pointed out that interpretation of its scope should only be conclusive when made in the light of the subjoined claim.

I claim:

In a pipe fitting, a water meter reducing adapter comprising a sleeve of substantially uniform diameter throughout the greater portion of the length thereof and having a comparatively short unthreaded outer surface at one end with the remainder of the outer surface threaded from the unthreaded part to the opposite end of the fitting, said fitting having an internally threaded bore extending inwardly from the end thereof on which the said smooth surface is positioned, and a smooth bore of smaller diameter than that of the threaded bore forming an abutment to engage the end of a nipple extending from the meter providing uniform flow through the adapter, said smooth bore extending from the threaded bore to the opposite end of the fitting and aligned with the threaded bore.

MARTIN T. BULLOCK.

REFERENCES CITED

The following references are of record in the file of this patent:

UNITED STATES PATENTS

| Number | Name | Date |
|---|---|---|
| 703,595 | Kenneally | July 1, 1902 |
| 844,354 | Hawkinson | Feb. 19, 1907 |
| 908,245 | Goodall | Jan. 3, 1911 |